(12) United States Patent
Macnamara et al.

(10) Patent No.: US 9,652,903 B2
(45) Date of Patent: May 16, 2017

(54) METHOD AND APPARATUS FOR DETERMINING A WHEEL END CONDITION

(71) Applicant: Bendix Commercial Vehicle Systems LLC, Elyria, OH (US)

(72) Inventors: Joseph Macnamara, Ashland, OH (US); Jeffrey White, Sheffield Lake, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 65 days.

(21) Appl. No.: 14/703,930

(22) Filed: May 5, 2015

(65) Prior Publication Data
US 2016/0328889 A1    Nov. 10, 2016

(51) Int. Cl.
G07C 5/08    (2006.01)
G01P 3/44    (2006.01)

(52) U.S. Cl.
CPC ............. G07C 5/0808 (2013.01); G01P 3/44 (2013.01)

(58) Field of Classification Search
CPC .................................. G07C 5/0808; G01P 3/44
See application file for complete search history.

(56) References Cited

U.S. PATENT DOCUMENTS

| | | | | |
|---|---|---|---|---|
| 4,900,100 A | * | 2/1990 | Higashimata | B60T 8/173 303/150 |
| 5,240,313 A | * | 8/1993 | Yoshino | B60T 8/1706 303/137 |
| 5,325,300 A | * | 6/1994 | Tsuyama | B60T 8/175 180/197 |
| 5,353,225 A | * | 10/1994 | Tsuyama | B60T 8/175 180/197 |
| 5,421,644 A | * | 6/1995 | Prescott | B60T 8/1764 188/181 C |
| 5,466,054 A | * | 11/1995 | Okazaki | B60T 8/172 303/149 |

(Continued)

FOREIGN PATENT DOCUMENTS

| | | |
|---|---|---|
| DE | 4431045 A1 | 9/1994 |
| WO | WO2004027433 A1 | 8/2003 |

OTHER PUBLICATIONS

Bendix Commercial Vehicle Systems LLC, BW2364 "Bendix WS-24 Antilock Wheel speed sensor," Service Data Sheet, Sep. 2004, 4 pages, Bendix Commercial Vehicle Systems LLC, Elyria Ohio, U.S.A.

*Primary Examiner* — Frederick Brushaber
(74) *Attorney, Agent, or Firm* — Cheryl L. Greenly; Brian E. Kondas; Eugene E. Clair

(57) ABSTRACT

Various embodiments of an apparatus and method for determining a wheel end condition are disclosed. In one example, a controller for determining a wheel end condition comprises a plurality of wheel speed sensor inputs for receiving wheel speed sensor signals from a plurality of associated wheel speed sensors installed at associated wheel ends. The controller includes control logic that determines a speed as a function of the wheel speed sensor signal; receives a resistance value of the individual wheel speed sensor and compares the resistance value to a first and second high resistance threshold and a low resistance threshold. The control logic determines a wheel end condition exists at the associated wheel end as a function of the speed and the resistance value.

20 Claims, 3 Drawing Sheets

(56) References Cited

U.S. PATENT DOCUMENTS

| | | | |
|---|---|---|---|
| 5,559,286 A | 9/1996 | White | |
| 5,736,852 A | 4/1998 | Pattantyus | |
| 6,474,750 B2 * | 11/2002 | Tanaka | B60T 8/172 |
| | | | 303/113.4 |
| 6,828,779 B2 | 12/2004 | Townsend | |
| 7,165,657 B2 | 1/2007 | Palladino | |
| 7,573,391 B2 | 8/2009 | Adam | |
| 2011/0035126 A1 * | 2/2011 | Ishikawa | B60W 40/064 |
| | | | 701/65 |
| 2012/0029783 A1 * | 2/2012 | Takenaka | B60T 8/172 |
| | | | 701/73 |
| 2013/0076117 A1 * | 3/2013 | Sekiya | B60T 8/1764 |
| | | | 303/149 |

* cited by examiner

METHOD AND APPARATUS FOR DETERMINING A WHEEL END CONDITION

BACKGROUND

The present invention relates to embodiments of an apparatus and method for determining commercial vehicle wheel end conditions, such as a high temperature wheel brake or lockup due to low temperatures. It is desirable for the driver of a commercial vehicle to know if the brake assembly on a wheel end on either the tractor or trailer is locked up prior to pulling away from his location. Tractors and trailers may be stationary for long periods of time and exposed to extreme temperatures. A wheel end lockup may occur because the braking components at the wheel end are immovable due to corrosion or freezing temperatures and then the brakes are unable to be released immediately when the driver desires to drive the vehicle away from the location. In addition, commercial vehicle brakes may be applied for long periods of time, such as when the vehicle is traveling down an incline, which causes an increase in the temperature at the wheel end. It is desirable to quickly indicate potential wheel end lockup or high temperature conditions at a wheel end.

SUMMARY

Various embodiments of a controller for determining a wheel end condition are disclosed. A controller for determining a wheel end condition comprises a plurality of wheel speed sensor inputs for receiving wheel speed sensor signals from a plurality of associated wheel speed sensors installed at associated wheel ends; and a processor with control logic. The control logic is operative for receiving a resistance value of an individual wheel speed sensor; determining a speed as a function of an individual wheel speed sensor signal associated with the individual wheel speed sensor; and comparing the resistance value of the individual wheel speed sensor to a first high resistance threshold, a second high resistance threshold and a low resistance threshold. The control logic determines a wheel end condition exists at a wheel end associated with the individual wheel speed sensor as a function of one of: the individual wheel speed sensor resistance value being greater than the first high resistance threshold; and the individual wheel speed sensor resistance value being one of greater than the second high resistance threshold and less than the low resistance threshold and the speed determined from the individual wheel speed sensor signal being less than a speed determined from at least one of any other wheel speed sensor signal or combination of wheel speed sensor signals.

In accordance with another aspect, a method for determining a wheel end condition comprises receiving a wheel speed sensor signal; determining a speed at the wheel end as a function of the wheel speed sensor signal and determining a resistance value of the wheel speed sensor. The method determines a wheel end condition exists as a function of one of: the resistance value being greater than a first high resistance threshold; and the resistance value being one of greater than a second high resistance threshold and less than a low resistance threshold and the speed being less than a speed determined from at least one of any other wheel speed sensor signal or combination of wheel speed sensor signals.

In accordance with another aspect, a system for determining a condition of a wheel end brake comprises a plurality of wheel speed sensors; a plurality of exciter rings; and a controller with control logic in communication with the plurality of wheel speed sensors. The control logic is operative for receiving wheel speed sensor signals from the plurality of wheel speed sensors; determining speeds of each wheel speed sensor as a function of the wheel speed sensor signals; determining resistance value of each wheel speed sensor; and determining an air gap speed of each wheel speed sensor, indicative of the distance of each wheel speed sensor from each exciter ring. The control logic determines a wheel end condition exists at a wheel end associated with an individual wheel speed sensor as a function of one of: the individual wheel speed sensor resistance value being greater than the first high resistance threshold; and the individual wheel speed sensor resistance value being one of greater than the second high resistance threshold and less than the low resistance threshold, the speed determined from the individual wheel speed sensor signal being less than a speed determined from at least one of any other wheel speed sensor signal or combination of wheel speed sensor signals and the air gap speed being less than an air gap speed limit.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
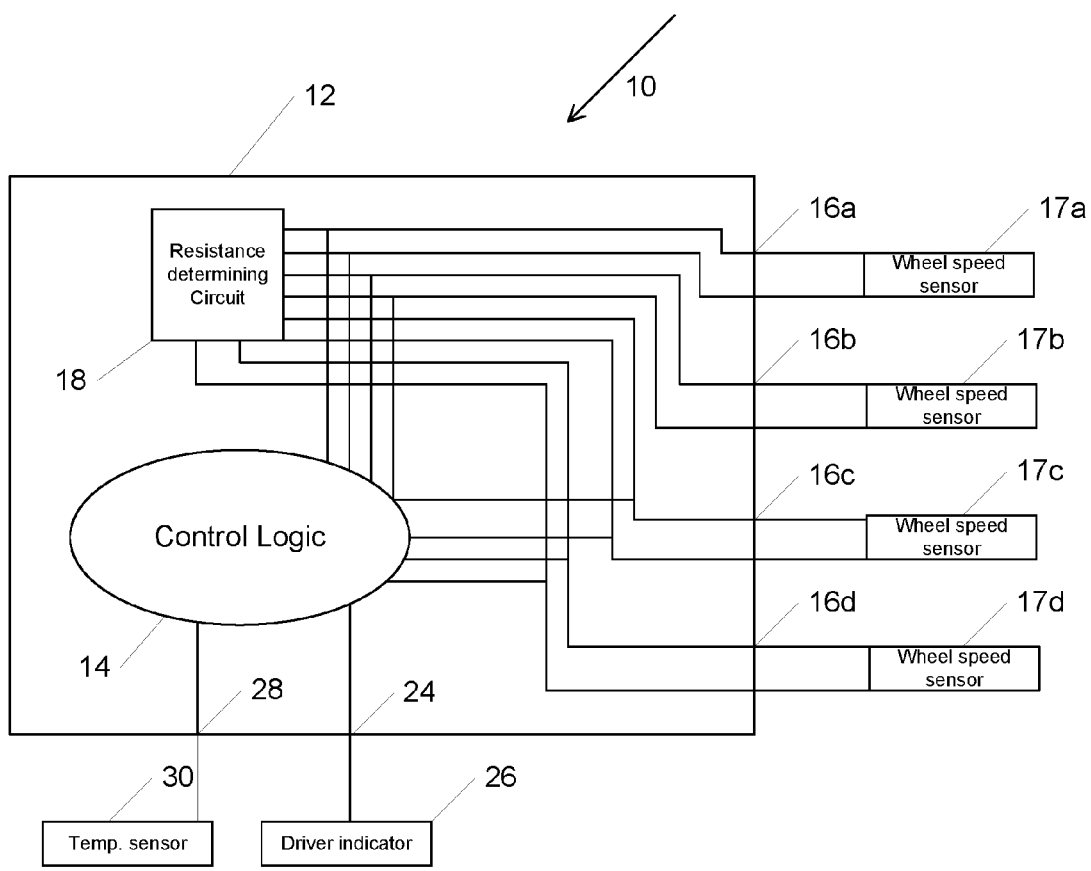
FIG. 1 illustrates a schematic representation of a controller for determining a wheel end condition on a vehicle according to an example of the present invention.
Figure 2:
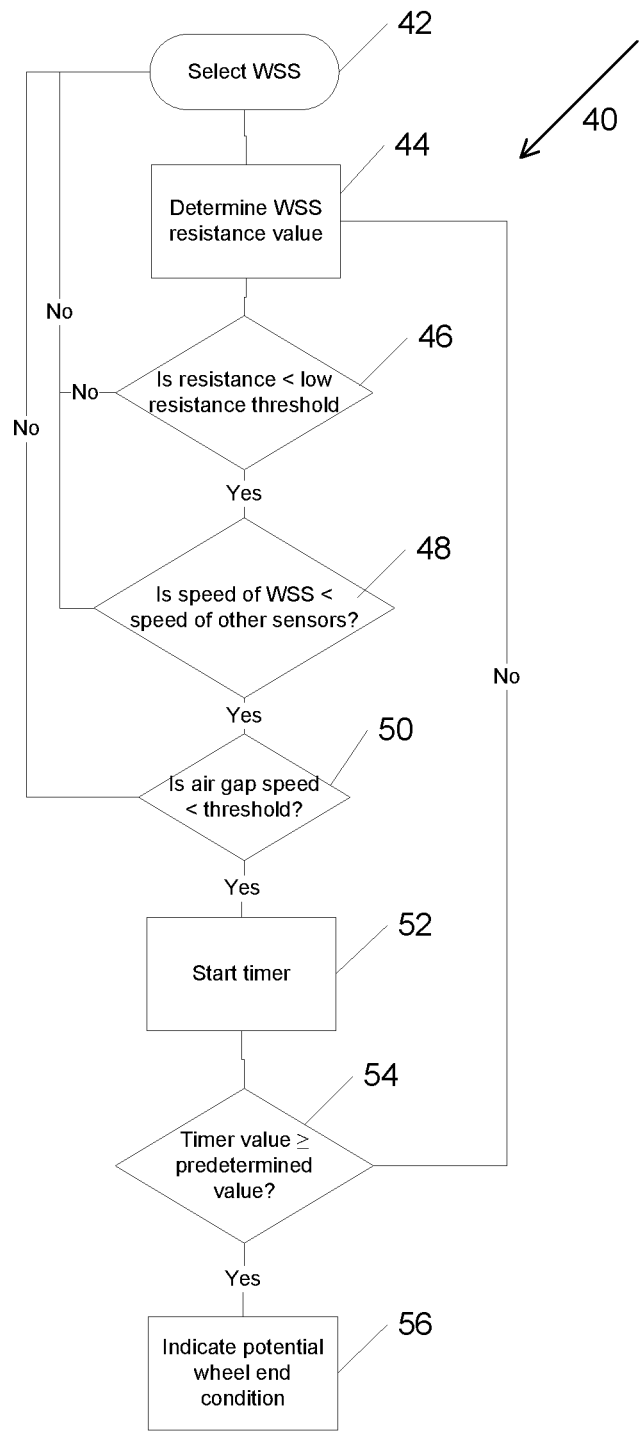
FIG. 2 illustrates a method of determining a wheel end condition according to an example of the present invention.
Figure 3:
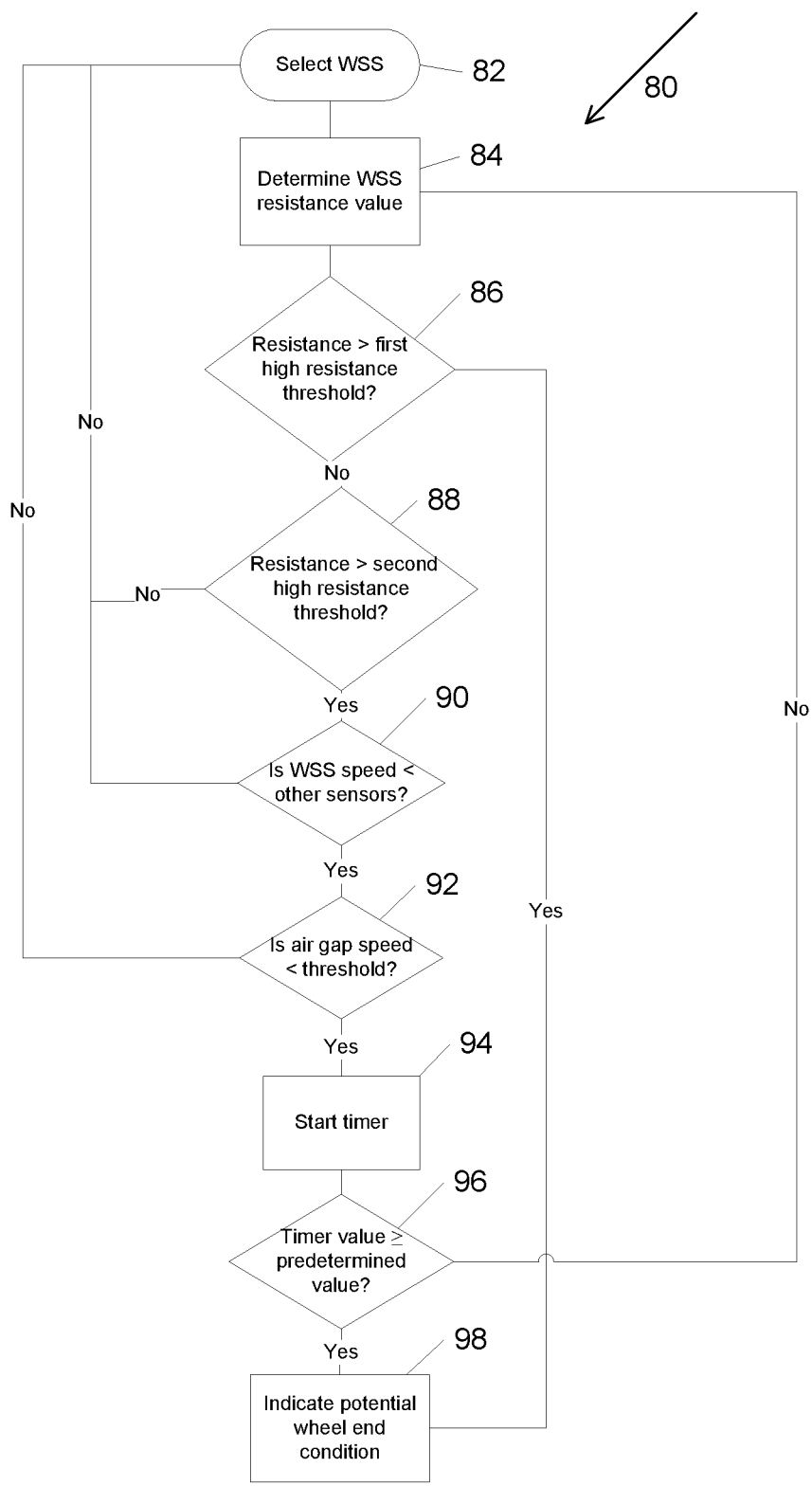
FIG. 3 illustrates a method of determining a wheel end condition according to another example of the present invention.

A system 10 for determining a wheel end condition on a commercial vehicle, such as wheel end lockup or a high temperature brake is shown in FIG. 1. The system 10 includes wheel speed sensors 17a, 17b, 17c, 17d. There may be greater or fewer wheel speed sensors depending on the configuration of the commercial vehicle, such as whether the commercial vehicle is a tractor trailer combination vehicle. Each wheel speed sensor 17a, 17b, 17c, 17d is installed as part of the braking system at each individual wheel end. There may be one wheel speed sensor per wheel end or the wheel speed sensors may be installed on only one axle of a tandem axle tractor or trailer. The wheel speed sensor 17a, 17b, 17c, 17d is installed proximate to an associated exciter ring at each wheel end (not shown). Each wheel speed sensor 17a, 17b, 17c, 17d has a nominal resistance value. For example, each wheel speed sensor 17a, 17b, 17c, 17d may have a nominal resistance value of about 1200 ohms, representing the resistance of the wheel speed sensor when exposed to a temperature of about 25° C. Each wheel speed sensor 17a, 17b, 17c, 17d transmits a wheel speed signal at a frequency indicative of the speed of rotation of the wheel end. The amplitude of the wheel speed signal is indicative of the distance the wheel speed sensor 17a, 17b, 17c, 17d is from the associated exciter ring. The wheel speed sensors 17a, 17b, 17c, 17d may be of the type WS-24™ wheel speed sensors from Bendix Commercial Vehicle Systems LLC of Elyria, Ohio.

The system 10 includes a controller 12 for use in determining a wheel end condition. The controller 12 may also include functionality for antilock braking or stability control. The controller 12 includes a plurality of wheel speed inputs, such as four wheel speed inputs 16a, 16b, 16c, 16d, for receiving individual wheel speed sensor signals from wheel speed sensors 17a, 17b, 17c, 17d. The location of installation of wheel speed sensor 17a at the front left wheel end of the vehicle is known by its connection to the wheel speed sensor input 16a, which is associated with the front left wheel end of the vehicle, for example. The controller 12 includes as many wheel speed inputs as there are wheel speed sensors in the system 10.

The controller 12 may include a resistance determining circuit 18 for determining the resistance value of the wheel speed sensors 17a, 17b, 17c, 17d connected to the controller 12 at the four wheel speed inputs 16a, 16b, 16c, 16d. The resistance determining circuit 18 may be an analog circuit or an application specific integrated circuit.

The controller 12 includes an output 24 for communicating a signal indicating a wheel end condition. The output 24 may be connected to a driver indicator device 26, or may communicate with a vehicle communications bus (not shown). The driver indicator device 26 may be a lamp or other display device that will indicate a wheel end condition.

The controller 12 may include an input 28 for receiving a signal indicative of the ambient temperature around the vehicle from an ambient temperature sensor 30. The temperature sensor 30 is located on the vehicle at a location away from any of the wheel speed sensors and should not be located near a vehicle component that generates heat as part of the vehicle operation. Alternatively, the ambient temperature value may be available from another controller and received over the vehicle communications bus.

The controller 12 includes a processor having control logic 14 for performing the wheel end condition determining functions. The control logic 14 communicates with four wheel speed sensor inputs 16a, 16b, 16c, 16d, the resistance determining circuit 18 and the output 24. The control logic 14 of the controller 12 receives wheel speed signal information via the wheel speed sensor inputs 16a, 16b, 16c, 16d. From the wheel speed signal information, the control logic 14 determines individual wheel speed, the speed of the vehicle and an air gap speed limit indicative of the air gap that exists between each wheel speed sensor and the associated exciter ring. The control logic 14 receives the resistance value of each individual wheel speed sensor from the resistance determining circuit 18. From the resistance value, the control logic 14 determines a temperature value of each wheel speed sensor location. The control logic 14 may use the information from the ambient temperature sensor 30 in determining an ambient compensated low resistance threshold and first and second high resistance threshold. The control logic 14 sends a signal indicative of the condition of each wheel end via the control output 24. The control logic 14 may also include a timer. The control logic 14 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 14.

Therefore, a controller for determining a wheel end condition comprises a plurality of wheel speed sensor inputs for receiving wheel speed sensor signals from a plurality of associated wheel speed sensors installed at associated wheel ends; and a processor with control logic. The control logic is operative for receiving a resistance value of an individual wheel speed sensor; determining a speed as a function of an individual wheel speed sensor signal associated with the individual wheel speed sensor; and comparing the resistance value of the individual wheel speed sensor to a first high resistance threshold, a second high resistance threshold and a low resistance threshold. The control logic determines a wheel end condition exists at a wheel end associated with the individual wheel speed sensor as a function of one of: the individual wheel speed sensor resistance value being greater than the first high resistance threshold; and the individual wheel speed sensor resistance value being one of greater than the second high resistance threshold and less than the low resistance threshold and the speed determined from the individual wheel speed sensor signal being less than a speed determined from at least one of any other wheel speed sensor signal or combination of wheel speed sensor signals.

Therefore, a system for determining a condition of a wheel end brake comprises a plurality of wheel speed sensors; a plurality of exciter rings; and a controller with control logic in communication with the plurality of wheel speed sensors. The control logic is operative for receiving wheel speed sensor signals from the plurality of wheel speed sensors; determining speeds of each wheel speed sensor as a function of the wheel speed sensor signals; determining resistance value of each wheel speed sensor; and determining an air gap speed of each wheel speed sensor, indicative of the distance of each wheel speed sensor from each exciter ring. The control logic determines a wheel end condition exists at a wheel end associated with an individual wheel speed sensor as a function of one of: the individual wheel speed sensor resistance value being greater than the first high resistance threshold; and the individual wheel speed sensor resistance value being one of greater than the second high resistance threshold and less than the low resistance threshold, the speed determined from the individual wheel speed sensor signal being less than a speed determined from at least one of any other wheel speed sensor signal and combination of wheel speed sensor signals and the air gap speed being less than an air gap speed limit.

A method 40 of determining a wheel end condition due to a low temperature at the wheel end according to one example is disclosed. In step 42, the method is initiated by selecting a wheel speed sensor to test, such as wheel speed sensor 17a, for example. In step 44, the wheel speed sensor resistance value is determined in the resistance determining circuit 18 or by another means.

In step 46, the resistance value is compared to a low resistance threshold value. In one example, the low resistance threshold value is about 20% lower than the nominal resistance value. In one example, the nominal resistance value of the wheel speed sensor is about 1200 ohms at an ambient temperature of about 25 C. If the resistance value is greater than or equal to the low resistance threshold, the method 40 returns to step 42 to select the next wheel speed sensor for evaluation. If the resistance is less than the low resistance threshold value, the method 40 continues to step 48.

In step 48, the speed of wheel speed sensor 17a is compared to an ascertained speed. The ascertained speed is determined from any one of the other wheel speed sensors or combination of wheel speed sensors. If the speed of wheel speed sensor 17a is approximately the same as or greater than the speed of any one of the other wheel speed sensors or combination of wheel speed sensors, the method 40 returns to step 42. If the speed of wheel speed sensor 17*a* is less than the ascertained speed, the method 40 continues to step 50. In another example, when the speed of the wheel speed sensor 17*a* is between about three miles an hour and about eight miles an hour less than any one of the other wheel speed sensors, the method 40 would continue to step 50. For example, when the speed of wheel speed sensor 17*a* is about zero and the speed of at least two of the other sensors is above three miles per hour, the wheel speed sensor 17*a* is considered to be at a speed less than the other wheel speed sensors. Alternatively, the controller 12 may receive the ascertained speed from another controller, such as a tractor controller when controller 12 is located on a trailer. The ascertained speed may be received directly or through the vehicle communications bus.

In step 50, the control logic 14 determines the air gap speed of wheel speed sensor 17*a* and compares the air gap speed to an air gap speed limit. The air gap speed limit is defined as that speed above which the wheel speed sensor can provide a signal. Defects in the exciter ring can cause voltage variation and limit the usable wheel speed signal. In addition, the larger the gap between the wheel speed sensor and the exciter ring, the higher the air gap speed. In one example, the predetermined air gap speed limit is about 10 km/hr. The air gap speed can be indicative of the distance of the wheel speed sensor from the exciter ring. If the air gap speed is greater than or equal to the air gap speed limit, the method 40 returns to step 42. The wheel speed sensor 17*a* should not be used to determine a wheel end condition according to the method 40 due to the air gap being beyond the limit, thereby causing the high speed differential as determined in step 48. If the air gap speed is less than the air gap speed limit, the method 40 continues to step 52.

In step 52, a timer is begun in the control logic 14. In step 54, the timer value is compared to a predetermined time value. If the timer value has not exceeded the predetermined time value, the method 40 returns to step 44 and the resistance value, wheel speed and air gap speed are determined anew for the same sensor 17*a*. If the timer value equals or exceeds the predetermined value, the method continues to step 56. In another example, the predetermined timer value is between 10 ms and 100 ms. In one example, the predetermined timer value is about 100 ms.

In step 56, the control logic 14 determines that a wheel end condition due to low temperature is present at the location of wheel speed sensor 17*a*. The control logic 14 will transmit a signal, such as directly to driver display 26 via output 24 or alternatively over the vehicle communications bus, indicating that a wheel end condition due to low temperature is present at that particular wheel end.

A method 80 of determining a wheel end condition due to a high temperature at the wheel end, such as lockup or excessive brake usage, according to another example is disclosed. In step 82, the method 80 is initiated by selecting a sensor to test, such as wheel speed sensor 17*a*, for example. In step 84, the wheel speed sensor resistance value is determined in the resistance determining circuit 18 or by another means.

In step 86, the resistance value is compared to a first high resistance threshold value. In one example, the first high resistance threshold value is about 50% higher than the nominal resistance value. The nominal resistance value of the wheel speed sensor may be about 1200 ohms at an ambient temperature of about 25 C. If the resistance is less than or equal to the first high resistance threshold, the method 80 proceeds to step 88. If the resistance is greater than the first high resistance threshold value, the method 80 continues directly to step 98 to indicate a potential wheel end condition. The first high resistance threshold value is set at a value for a temperature known to occur with severe high temperature conditions.

In step 88, the resistance value is compared to a second high resistance threshold value. In one example, the second high resistance threshold value is about 25% higher than the nominal resistance value. If the resistance value is less than or equal to the second high resistance threshold, the method 80 returns to step 82 to select another wheel speed sensor for analysis. If the resistance value is greater than the second high resistance threshold value, the method 80 proceeds to step 90.

The first and second high resistance threshold may be set to different values based on types of brakes installed at wheel end. For example, a wheel end equipped with air disc brakes may have the first and second high resistance threshold set at values higher than a wheel end equipped with air drum brakes because air disc brakes generally generate higher temperatures under normal operating conditions. However, the second high resistance threshold would be set to a lower value than the first high resistance threshold. Alternatively, the control logic 14 may determine an ambient compensated nominal resistance value based on the ambient temperature value received from temperature sensor 30. In this manner, a vehicle running in a hot ambient environment will not unduly cause wheel end condition warnings. In another example, the wheel speed sensor resistance value of the selected wheel can be compared to the other wheel speed sensor resistance values, when known. If the selected wheel speed sensor resistance value is 25% greater than the highest of the other known wheel speed sensor resistance values, the method 80 would continue directly to step 98 as well.

In another example, the second threshold may be based on the load of the vehicle. If the vehicle is heavily loaded, the second threshold may be set higher to prevent nuisance alerts of wheel end conditions, as the normal operating conditions of a heavily loaded vehicle may create higher normal operating temperatures at the wheel end. In another example, the second threshold can be modified if the controller receives information about whether the vehicle operator is actuating the brakes. The second threshold would be set higher if the operator is braking the vehicle, because the expectation is that the brakes would get hot very quickly as the brakes were depressed. The temperature of a wheel speed sensor on a non-braked wheel end would be expected to be at a lower normal operating temperature in a non-braking condition. Therefore, the second threshold may be set lower for a wheel speed sensor on a non-braked wheel end in order to indicate a wheel end condition sooner.

In step 90, the speed of wheel speed sensor 17*a* is compared to an ascertained speed. The ascertained speed is determined from any one of the other wheel speed sensors or combination of wheel speed sensors. If the speed of wheel speed sensor 17*a* is approximately the same as or greater than the speed of any one of the other wheel speed sensors or combination of wheel speed sensors, the method 80 returns to step 82. If the speed of the wheel speed sensor 17*a* is less than the ascertained speed, the method 80 continues to step 92. In another example, when the speed of the wheel speed sensor 17*a* is between about three miles an hour and about eight miles an hour less than any one of the other wheel speed sensors, the method 80 would continue to step 92. For example when the speed of wheel speed sensor 17*a* is about zero and the speed of at least two of the other sensors is above three miles per hour, the wheel speed sensor 17*a* is considered to be at a speed less than the other wheel speed sensors. Alternatively, the controller 12 may receive the ascertained speed from another controller, such as a tractor controller when controller 12 is located on a trailer. The ascertained speed may be received directly or through the vehicle communications bus.

In step 92, the control logic 14 determines the air gap speed of wheel speed sensor 17a and compares the air gap speed to an air gap speed limit. The air gap speed limit is defined as that speed above which the wheel speed sensor can provide a signal. Defects in the exciter ring can cause voltage variation and limit the usable wheel speed signal. In addition, the larger the gap between the wheel speed sensor and the exciter ring, the higher the air gap speed. In one example, the predetermined air gap speed limit is about 10 km/hr. The air gap speed can be indicative of the distance of the wheel speed sensor from the exciter ring. If the air gap speed is greater than or equal to the air gap speed limit, the method 80 returns to step 82. The wheel speed sensor 17a should not be used in this instance to determine a wheel end condition according to the method 80 due to the air gap being beyond the limit, thereby causing the high speed differential as determined in step 90. The method 80 determines a wheel end condition if there is not already a fault due to an excessive air gap. If the air gap speed is less than the air gap speed limit, meaning that the wheel speed sensor air gap is not excessive and a signal is being received, the method 80 continues to step 94.

In step 94, a timer is begun in the control logic 14. In step 96, the timer value is compared to a predetermined time value. If the timer value has not exceeded the predetermined time value, the method 80 returns to step 84 and the resistance value, wheel speed and air gap speed are determined anew for the same sensor 17a. If the timer value equals or exceeds the predetermined value, the method continues to step 98. In one example, the predetermined timer value is about 100 ms.

In step 98, the control logic 14 determines that a wheel end condition due to high temperature is present at the location of wheel speed sensor 17a. The control logic 14 will transmit a signal, such as directly to driver display 26 via output 24 or alternatively over the vehicle communications bus, indicating that a wheel end condition due to high temperature is present at that particular wheel end.

In one example, the method 40 for determining a wheel end condition due to low temperature and the method 80 for determining a wheel end condition due to high temperature run in parallel, in another example, the method 40 and method 80 are run in series such that the resistance value is first compared to the low resistance threshold and then compared to the high resistance threshold.

Therefore, a method for determining a wheel end condition comprises receiving a wheel speed sensor signal; determining a speed at the wheel end as a function of the wheel speed sensor signal and determining a resistance value of the wheel speed sensor. The method determines a wheel end condition exists as a function of one of: the resistance value being greater than a first high resistance threshold; and the resistance value being one of greater than a second high resistance threshold and less than a low resistance threshold and the speed being less than an ascertained speed.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for determining a wheel end condition comprising:
   a plurality of wheel speed sensor inputs for receiving wheel speed sensor signals from a plurality of associated wheel speed sensors installed at associated wheel ends;
   an input for receiving an indication of brake actuation; and
   a processor with control logic, the control logic operative for:
      receiving a resistance value of an individual wheel speed sensor;
      determining a speed as a function of an individual wheel speed sensor signal associated with the individual wheel speed sensor;
      comparing the resistance value of the individual wheel speed sensor to a first high resistance threshold, a second high resistance threshold and a low resistance threshold wherein the second high resistance threshold is increased in response to the indication of brake actuation; and
      determining a wheel end condition exists at a wheel end associated with the individual wheel speed sensor as a function of one of:
         the individual wheel speed sensor resistance value being greater than the first high resistance threshold; and
         the individual wheel speed sensor resistance value being greater than the second high resistance threshold or less than the low resistance threshold and the speed determined from the individual wheel speed sensor signal being less than an ascertained speed.

2. The controller as in claim 1, wherein the ascertained speed is determined from at least one of any other wheel speed sensor signal and combination of wheel speed sensor signals.

3. The controller as in claim 1 further comprising: a resistance determination circuit communicating with the individual wheel speed sensor and capable of transmitting the resistance value of the individual wheel speed sensor to the control logic.

4. The controller as in claim 1 wherein the control logic is further operative for: determining a low temperature condition at the associated wheel end as a function of the individual wheel speed sensor resistance value being less than the low resistance threshold and the speed determined from the individual wheel speed sensor signal being about three miles an hour to eight miles an hour less than the ascertained speed.

5. The controller as in claim 1, wherein the control logic is further operative for determining an air gap speed, indicative of a distance of the individual wheel speed sensor from an associated exciter ring.

6. The controller as in claim 5, further comprising determining a low temperature condition at the wheel end associated with the individual wheel speed sensor as a function of the resistance value being less than the low resistance threshold, the speed being less than the ascertained speed and the air gap speed being less than an air gap speed limit.

7. The controller as in claim 5, wherein the processor is further operative for determining a high temperature condition at the wheel end associated with the individual wheel speed sensor as a function of the resistance value being greater than a second high temperature threshold, the speed being less than an ascertained speed and the air gap speed being less than a an air gap speed limit, wherein the second high temperature threshold is less than the first high temperature threshold.

8. The controller as in claim 1, wherein the processor is further operative for receiving an ambient temperature value and determining a nominal resistance of the individual wheel speed sensor at the ambient temperature value.

9. The controller as in claim 8, wherein the processor is further operative for setting the low resistance threshold at about 20% less than the nominal resistance of the wheel speed sensor at the ambient temperature value.

10. The controller as in claim 9, wherein the processor is further operative for setting the first high resistance threshold at about 50% greater than the nominal resistance of the wheel speed sensor.

11. The controller as in claim 1, further comprising an output for actuating an associated driver indicator device for indicating the wheel end condition.

12. A method for determining a wheel end condition comprising:
receiving a wheel speed sensor signal;
determining a speed at the wheel end as a function of the wheel speed sensor signal;
determining a resistance value of the wheel speed sensor;
receiving an input indicative of a brake actuation;
determining a wheel end condition exists as a function of one of:
the resistance value being greater than a first high resistance threshold; and
the resistance value being greater than a second high resistance threshold, wherein the second high resistance threshold is increased in response to an indication of brake actuation, or less than a low resistance threshold and the speed being less than an ascertained speed.

13. The method as in claim 12, wherein the ascertained speed is determined from at least one of any other wheel speed sensor signal and combination of wheel speed sensor signals.

14. The method as in claim 12, further comprising setting the low resistance threshold at about 20% less than a nominal resistance of the wheel speed sensor.

15. The method as in claim 12, further comprising determining an air gap speed, indicative of a distance of the wheel speed sensor from an associated exciter ring.

16. The method as in claim 15, further comprising transmitting a low temperature wheel end condition warning as a function of the resistance value being less than the low resistance threshold, the air gap speed being less than an air gap speed limit and the speed being less than the ascertained speed.

17. The method as in claim 12, further comprising transmitting a high temperature wheel end condition warning as a function of the resistance being greater than the first high resistance threshold.

18. A system for determining a condition of a wheel end brake comprising:
a plurality of wheel speed sensors;
a plurality of exciter rings;
a controller in communication with the plurality of wheel speed sensors, the controller having control logic operative for
receiving wheel speed sensor signals from the plurality of wheel speed sensors;
determining speeds of each wheel speed sensor as a function of the wheel speed sensor signals;
determining resistance value of each wheel speed sensor;
receiving an indication of brake actuation;
determining an air gap speed of each wheel speed sensor, indicative of the distance of each wheel speed sensor from each exciter ring;
determining a wheel end condition exists at a wheel end associated with an individual wheel speed sensor as a function of one of:
the individual wheel speed sensor resistance value being greater than the first high resistance threshold; and
the individual wheel speed sensor resistance value being greater than the second high resistance threshold, wherein the second high resistance threshold is increased in response to brake actuation, or less than the low resistance threshold, the speed determined from the individual wheel speed sensor signal being less than an ascertained speed and the air gap speed being less than an air gap speed limit.

19. The system as in claim 18, wherein the controller is further operative for setting the first high resistance threshold and a second high resistance threshold as a function of the type of wheel end brake.

20. A controller for determining a wheel end condition comprising:
a plurality of wheel speed sensor inputs for receiving wheel speed sensor signals from a plurality of associated wheel speed sensors installed at associated wheel ends;
means for determining a resistance value of an individual wheel speed sensor and comparing the resistance value of the individual wheel speed sensor to a first high resistance threshold, a second high resistance threshold and a low resistance threshold;
means for determining a speed as a function of an individual wheel speed sensor signal associated with the individual wheel speed sensor;
means for determining a distance of the individual wheel speed sensor from an associated exciter ring;
means for receiving an indication of brake actuation; and
control logic operative to determine a wheel end condition exists at a wheel end associated with the individual wheel speed sensor as a function of one of:
the individual wheel speed sensor resistance value being greater than the first high resistance threshold; and
the individual wheel speed sensor resistance value being greater than the second high resistance threshold, wherein the second high resistance threshold is increased in response to the indication of brake actuation, or less than the low resistance threshold and the speed determined from the individual wheel speed sensor signal being less than a speed determined from at least one of any other wheel speed sensor signal and combination of wheel speed sensor signals.

* * * * *